United States Patent
Glugla et al.

(10) Patent No.: US 9,797,327 B2
(45) Date of Patent: Oct. 24, 2017

(54) METHOD AND SYSTEM FOR PRE-IGNITION CONTROL

(71) Applicant: Ford Global Technologies, LLC, Dearborn, MI (US)

(72) Inventors: Chris Paul Glugla, Macomb, MI (US); Michael Damian Czekala, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 403 days.

(21) Appl. No.: 14/510,996

(22) Filed: Oct. 9, 2014

(65) Prior Publication Data

US 2015/0167573 A1  Jun. 18, 2015

Related U.S. Application Data

(60) Provisional application No. 61/917,863, filed on Dec. 18, 2013.

(51) Int. Cl.
*G06F 7/00* (2006.01)
*G06F 17/00* (2006.01)
(Continued)

(52) U.S. Cl.
CPC ......... *F02D 41/1498* (2013.01); *F02D 17/02* (2013.01); *F02D 35/027* (2013.01); *F02D 37/02* (2013.01); *F02D 41/0087* (2013.01); *F02D 41/1454* (2013.01); *F02P 5/045* (2013.01); *F02P 5/1522* (2013.01); *G01L 23/225* (2013.01); *F02B 2075/125* (2013.01); *F02D 13/0207* (2013.01); *F02D 19/084* (2013.01); *F02D 35/021* (2013.01); *F02D 35/023* (2013.01); *F02D 41/006* (2013.01); *F02D 2200/1012* (2013.01); *Y02T 10/123* (2013.01); *Y02T 10/36* (2013.01); *Y02T 10/46* (2013.01)

(58) Field of Classification Search
CPC .... F02D 41/1498; F02D 35/027; F02D 37/02; F02D 41/1454; F02D 41/0087; F02D 17/02; F02D 19/084; F02D 13/0207; F02D 35/023; F02D 35/021; F02D 2200/1012; F02D 41/006; G01L 23/225; F02P 5/045; F02P 5/1522; F02B 2075/125; Y02T 10/36; Y02T 10/46; Y02T 10/123
See application file for complete search history.

(56) References Cited

U.S. PATENT DOCUMENTS 6,230,687 B1 * 5/2001 Marca ................... F02D 41/062
  123/491
6,286,482 B1 * 9/2001 Flynn ....................... F02B 1/12
  123/25 C

(Continued)

*Primary Examiner* — David Hamaoui
(74) *Attorney, Agent, or Firm* — Julia Voutyras; McCoy Russell LLP (57) ABSTRACT

Methods and systems are provided for adjusting spark and/or fuel injection to a cylinder based on late combustion, partial burn, or misfire in a neighboring cylinder. In one example, a method may include deactivating spark and fuel injection to a second cylinder receiving exhaust residuals from combustion in a first cylinder, the first cylinder experiencing a misfire or late combustion event. Mitigating actions are performed in the second cylinder before the occurrence of a pre-ignition event.

6 Claims, 5 Drawing Sheets

(51) Int. Cl.

| | |
|---|---|
| *F02D 41/14* | (2006.01) |
| *F02P 5/04* | (2006.01) |
| *F02P 5/152* | (2006.01) |
| *F02D 17/02* | (2006.01) |
| *F02D 37/02* | (2006.01) |
| *G01L 23/22* | (2006.01) |
| F02D 41/00 | (2006.01) |
| F02D 35/02 | (2006.01) |
| F02B 75/12 | (2006.01) |
| F02D 13/02 | (2006.01) |
| F02D 19/08 | (2006.01) |

(56) References Cited

U.S. PATENT DOCUMENTS

| | | | |
|---|---|---|---|
| 6,827,061 B2 | | 12/2004 | Nytomt et al. |
| 6,883,497 B2 | | 4/2005 | Wozniak et al. |
| 6,959,692 B2 | * | 11/2005 | Song .................. F02D 13/0207 123/406.45 |
| 8,683,976 B2 | | 4/2014 | Cunningham et al. |
| 8,997,723 B2 | * | 4/2015 | Glugla ................. F02D 41/008 123/406.23 |
| 9,043,122 B2 | * | 5/2015 | Glugla ................... F02D 43/00 123/406.18 |
| 9,551,288 B2 | * | 1/2017 | Glugla ................. F02D 41/008 |
| 2013/0139786 A1 | * | 6/2013 | Glugla ............... F02D 41/0087 123/321 |
| 2014/0000552 A1 | | 1/2014 | Glugla et al. |
| 2014/0000555 A1 | | 1/2014 | Glugla et al. |
| 2014/0000557 A1 | | 1/2014 | Glugla et al. |
| 2014/0136085 A1 | * | 5/2014 | Martin .................... F02P 5/152 701/111 |

* cited by examiner

METHOD AND SYSTEM FOR PRE-IGNITION CONTROL

CROSS REFERENCE TO RELATED APPLICATIONS

This application claims priority to U.S. Provisional Patent Application No. 61/917,863, entitled "METHOD AND SYSTEM FOR PRE-IGNITION CONTROL," filed Dec. 18, 2013, the entire contents of which are hereby incorporated herein by reference for all purposes.

FIELD

The present description relates generally to methods and systems for controlling a vehicle engine to reduce pre-ignition events.

BACKGROUND/SUMMARY

Under certain operating conditions, engine cylinders can misfire or have slow burns. These misfires or slow burns can increase hot residuals entering an adjacent cylinder during cam or valve overlap periods. When this happens, the hot residuals can cause the misfire to pre-ignite within the adjacent cylinder. The pre-ignition can generate very high in-cylinder pressures that can result in combustion pressure waves similar to combustion knock, but with larger intensity.

Also, in boosted engines, late burn combustion events wherein the combustion is later than intended can also lead to pre-ignition combustion events. Specifically, the late combustion can lead to high exhaust manifold pressures and temperatures, as well as higher than intended exhaust residuals. The elevated exhaust manifold pressures can overcome the exhaust valve spring pressure and potentially open exhaust valves on adjacent cylinders, filling the cylinder with hot exhaust gas residual and increasing the likelihood of pre-ignition in the adjacent cylinders. The issue may be exacerbated in small volume exhaust manifolds, such as may be used in turbocharged engine systems to minimize the time to torque. As such, pre-ignition events can reduce engine performance and cause engine degradation.

The inventors herein have recognized that some of these issues may be at least partly addressed by a method for an engine, comprising: in response to misfire or at least a partial burn in a first cylinder, selectively deactivating spark ignition to a second cylinder receiving exhaust residuals from combustion in the first cylinder. In this way, late burn induced pre-ignition events may be reduced.

In one example, a misfire event, partial burn, or late combustion event in a first cylinder may be determined based on crankshaft acceleration, spark plug ionization current, cylinder pressure data, exhaust air-fuel ratio, etc. A second, neighboring cylinder that is most likely to receive exhaust residuals from the first cylinder may then be identified based on the identity of the first cylinder, the firing order of cylinders on the engine, as well as a configuration of the engine's exhaust manifold. In response to a misfire or late combustion event, a pre-ignition mitigating action may be performed in the second cylinder to reduce the likelihood of pre-ignition being induced in the second cylinder due to the late burn event in the first cylinder. This may include selective and temporary suspension of spark and fuel injection to the second cylinder. In some examples, only spark may be disabled, such as when the late combustion event is less retarded from a threshold timing or when the likelihood of pre-ignition in the second cylinder receiving the exhaust residuals is lower. The spark and/or fueling may be disabled for the combustion event in the second cylinder and then re-enabled for the immediately subsequent combustion event.

Further still, the pre-ignition mitigating action of disabling spark and/or fuel injection may be extended to additional cylinders. For example, a third cylinder that is most likely to receive exhaust residuals from combustion in the second cylinder may also have spark and fuel disabled, to reduce the likelihood of pre-ignition in the third cylinder due to hot residuals received from the second cylinder, and so on.

In this way, by deactivating spark and fuel injection to one or more cylinders likely to (progressively) receive exhaust residuals from late combustion in a neighboring cylinder, a temperature and pressure of the exhaust residuals may be decreased. By reducing the temperature and pressure of the residuals, the likelihood of pre-ignition induced in a cylinder due to receipt of hot exhaust residuals from a late burning or misfiring cylinder may be decreased. In addition, the likelihood of pre-ignition being induced in further cylinders by combustion in the cylinder receiving the hot residuals is also reduced. Overall, engine degradation due to pre-ignition can be mitigated.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for detecting delivery of hot residuals in a cylinder responsive to late combustion or misfire in a neighboring cylinder and adjusting spark and/or fuel injection to the affected cylinder so as to reduce late burn or misfire induced pre-ignition events. In one example, adjusting spark and/or fuel injection may include selectively deactivating spark and fuel injection to the affected cylinder. In engines configured with small exhaust manifolds, such as the engine systems of FIGS. 1-2, exhaust residuals from a late combustion event in a first cylinder can raise exhaust manifold pressures such that the residuals are forcibly received in a second, neighboring cylinder. An engine controller may be configured to perform a control routine, such as the routine of FIG. 3, to adjust spark and/or fuel injection to the second cylinder (e.g., deactivate spark and/or fuel injection) if the first cylinder is misfiring, or if a timing of combustion in the first cylinder is delayed beyond a threshold timing, wherein a large amount of hot exhaust residuals might be released from the first cylinder into the exhaust manifold and potentially forcibly received in the second cylinder (e.g., during valve overlap). Example fuel injection and spark adjustments are described with reference to FIGS. 4-5. By temporarily deactivating spark (e.g., deactivating fuel ignition) and/or fuel injection to the cylinder receiving hot residuals, a temperature of the residuals may be decreased and a likelihood of late burn or misfire induced pre-ignition may be reduced. This may, in turn, reduce engine degradation from pre-ignition events.

Figure 1:
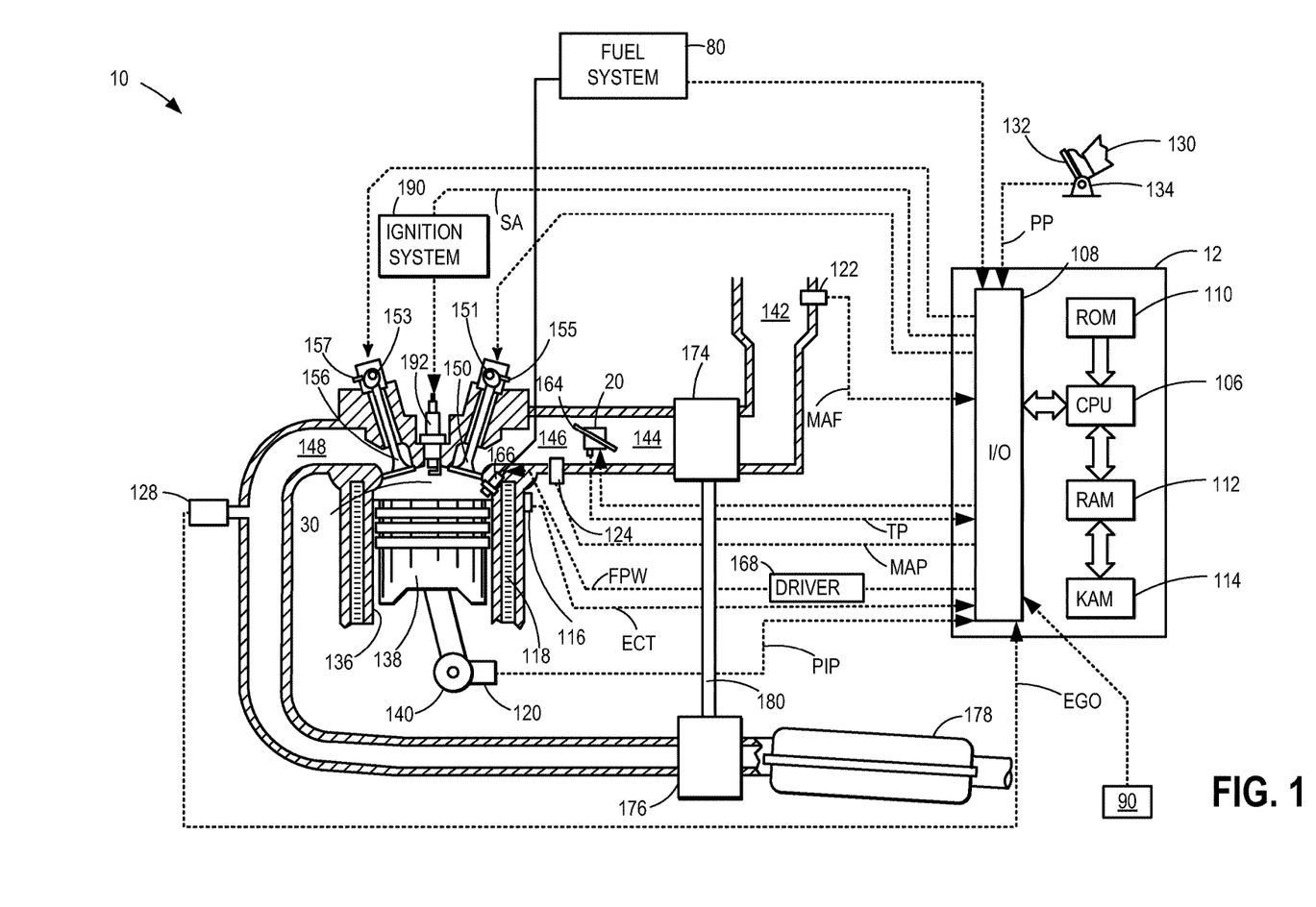
FIG. 1 shows a schematic diagram of an internal combustion engine.

FIG. 1 is a schematic diagram showing one cylinder of multi-cylinder engine 10, which may be included in a propulsion system of an automobile. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Combustion chamber (i.e. cylinder) 30 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of a vehicle via an intermediate transmission system. Further, a starter motor may be coupled to crankshaft 140 via a flywheel to enable a starting operation of engine 10.

Cylinder 30 can receive intake air via a series of intake air passages 142, 144, and 146. Intake air passage 146 can communicate with other cylinders of engine 10 in addition to cylinder 30. In some embodiments, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 20 including a throttle plate 164 may be provided along an intake passage of the engine for varying the flow rate and/or pressure of intake air provided to the engine cylinders. For example, throttle 20 may be disposed downstream of compressor 174 as shown in FIG. 1, or alternatively may be provided upstream of compressor 174.

Exhaust passage 148 can receive exhaust gases from other cylinders of engine 10 in addition to cylinder 30. In one example, exhaust passage 148 may receive exhaust from all the cylinders of engine 10. However, in some embodiments, as elaborated at FIG. 2, the exhaust from one or more cylinders may be routed to a first exhaust passage, while the exhaust from one or more other (remaining) cylinders may be routed to a second, different exhaust passage, the distinct exhaust passages then converging further downstream, at or beyond an exhaust emission control device. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Exhaust temperature may be estimated by one or more temperature sensors (not shown) located in exhaust passage 148. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods listed herein.

Each cylinder of engine 10 may include one or more intake valves and one or more exhaust valves. For example, cylinder 30 is shown including at least one intake poppet valve 150 and at least one exhaust poppet valve 156 located at an upper region of cylinder 30. In some embodiments, each cylinder of engine 10, including cylinder 30, may include at least two intake poppet valves and at least two exhaust poppet valves located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 150 and exhaust valve 156 may be determined by valve position sensors 155 and 157, respectively. In alternative embodiments, the intake and/or exhaust valve may be controlled by electric valve actuation. For example, cylinder 30 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

Cylinder 30 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 30 via spark plug 192 in response to spark advance signal SA from controller 12, under select operating modes. As discussed further below with reference to FIGS. 3-5, in response to late combustion or misfire in a first cylinder, the ignition spark may be disabled in a second neighboring cylinder receiving the exhaust residuals from the first cylinder in order to reduce the likelihood of pre-ignition is the second cylinder.

In some embodiments, each cylinder of engine 10 may be configured with one or more fuel injectors for providing fuel thereto. As a non-limiting example, cylinder 30 is shown including one fuel injector 166. Fuel injector 166 is shown coupled directly to cylinder 30 for injecting fuel directly therein in proportion to the pulse width of signal FPW received from controller 12 via electronic driver 168. In this manner, fuel injector 166 provides what is known as direct injection (hereafter also referred to as "DI") of fuel into combustion cylinder 30. While FIG. 1 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. It will be appreciated that, in an alternate embodiment, injector 166 may be a port injector providing fuel into the intake port upstream of cylinder 30.

It will be appreciated that in still further embodiments, the engine may be operated by injecting a variable fuel blend or knock/pre-ignition suppressing fluid via two injectors (a direct injector 166 and a port injector) and varying a relative amount of injection from each injector.

Fuel may be delivered to fuel injector 166 via a high pressure fuel system 80, including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12.

Fuel may be delivered by the injector(s) to the cylinder during a single engine cycle of the cylinder. Further, the distribution and/or relative amount of fuel delivered from the injector(s) may vary with operating conditions. For example, the distribution may vary with a rate of change of a cylinder aircharge, a nature of an abnormal cylinder combustion event (such as, whether there is a cylinder misfire event, knock event, or pre-ignition event). Furthermore, for a single combustion event, multiple injections of the delivered fuel may be performed per cycle. The multiple injections may be performed during the compression stroke, intake stroke, or any appropriate combination thereof.

As described above, FIG. 1 shows only one cylinder of a multi-cylinder engine. As such each cylinder may similarly include its own set of intake/exhaust valves, fuel injector(s), spark plug, etc.

Fuel tanks in fuel system 80 may hold fuel or knock/pre-ignition suppressing fluids with different qualities, such as different compositions. These differences may include different alcohol content, different water content, different octane, different heat of vaporizations, different fuel blends, and/or combinations thereof etc. In one example, fuels or knock/pre-ignition suppressing fluids with different alcohol contents could include one fuel being gasoline and the other being ethanol or methanol. In another example, the engine may use gasoline as a first substance and an alcohol containing fuel blend such as E85 (which is approximately 85% ethanol and 15% gasoline) or M85 (which is approximately 85% methanol and 15% gasoline) as a second substance. Other alcohol containing fuels could be a mixture of alcohol and water, a mixture of alcohol, water and gasoline etc. In still another example, both fuels may be alcohol blends wherein the first fuel may be a gasoline alcohol blend with a lower ratio of alcohol than a gasoline alcohol blend of a second fuel with a greater ratio of alcohol, such as E10 (which is approximately 10% ethanol) as a first fuel and E85 (which is approximately 85% ethanol) as a second fuel. In yet another example, one of the fluids may include water while the other fluid is gasoline or an alcohol blend. Additionally, the first and second fuels may also differ in other fuel qualities such as a difference in temperature, viscosity, octane number, latent enthalpy of vaporization etc. Still other pre-ignition suppressing fluids may include water, methanol, washer fluid (which is a mixture of approximately 60% water and 40% methanol), etc.

Moreover, fuel characteristics of the fuel or pre-ignition suppressing fluid stored in the fuel tank may vary frequently. In one example, a driver may refill the fuel tank with E85 one day, and E10 the next, and E50 the next. The day to day variations in tank refilling can thus result in frequently varying fuel compositions, thereby affecting the fuel composition delivered by injector 166.

Engine 10 may further include one (as depicted) or more knock sensors 90 distributed along a body of the engine (e.g., along an engine block). When included, the plurality of knock sensors may be distributed symmetrically or asymmetrically along the engine block. Knock sensor 90 may be an accelerometer, an ionization sensor, or a vibration sensor. In one example, the controller 12 may be configured to detect and differentiate engine block vibrations generated due to abnormal combustion events, such as knocking and pre-ignition, from the forced opening (and subsequent slamming shut) of a cylinder exhaust valve based on the output (e.g., signal timing, amplitude, intensity, frequency, etc.) of the one or more knock sensors 90. The controller may assess the sensor outputs in different timing windows that are cylinder specific and that are based on the nature of the vibration being detected. For example, vibrations generated due to the forced opening of a cylinder exhaust valve by exhaust residuals released from a late burning cylinder may be identified by knock sensor outputs sensed in a window that is relatively later during an open exhaust valve event of the late burning cylinder. In comparison, abnormal cylinder combustion events occurring in a firing cylinder may be identified by knock sensor outputs sensed in a window that is relatively earlier during an open exhaust valve event of the late burning cylinder. In one example, the windows in which the knock signals are estimated may be crank angle windows.

In further examples, the controller 12 may be configured to detect and differentiate the origin of the vibrations based on the output (e.g., signal timing, amplitude, intensity, frequency, etc.) of the one or more knock sensors as well as a rate of change of a parameter indicative of a cylinder aircharge such as a rate of change of a manifold pressure (MAP), a manifold air flow (MAF), etc.

It will be appreciated that while FIG. 1 suggests using knock sensors to sense engine block vibrations and forced entry of exhaust residuals into a cylinder, in alternate examples, other accelerometers, vibrations sensors, or in-cylinder pressure sensors can be used to sense the vibrations. Further, the accelerometers, vibrations sensors, in-cylinder pressure sensors, and ionization sensors may also be used to indicate a cylinder misfire event and distinguish the misfire event from knock or pre-ignition events. The misfire event may also be indicated based on engine speed fluctuations and/or an exhaust air-fuel ratio sensor output being leaner than a threshold, as elaborated below.

Controller 12 is shown in FIG. 1 as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; absolute manifold pressure signal (MAP) from sensor 124, cylinder AFR from EGO sensor 128, and abnormal combustion from a knock sensor 90 and a crankshaft acceleration sensor. Engine speed signal, RPM, may be generated by controller 12 from signal PIP. Manifold pressure signal MAP from a manifold pressure sensor may be used to provide an indication of vacuum, or pressure, in the intake manifold. Still other sensors such as cylinder pressure sensors, knock sensors, and/or pre-ignition sensors may be coupled to engine 10 (e.g., to a body of the engine) to help in the identification of abnormal combustion events.

Storage medium read-only memory 110 can be programmed with computer readable data representing instructions executable by processor 106 for performing the methods described below as well as other variants that are anticipated but not specifically listed.

Figure 2:
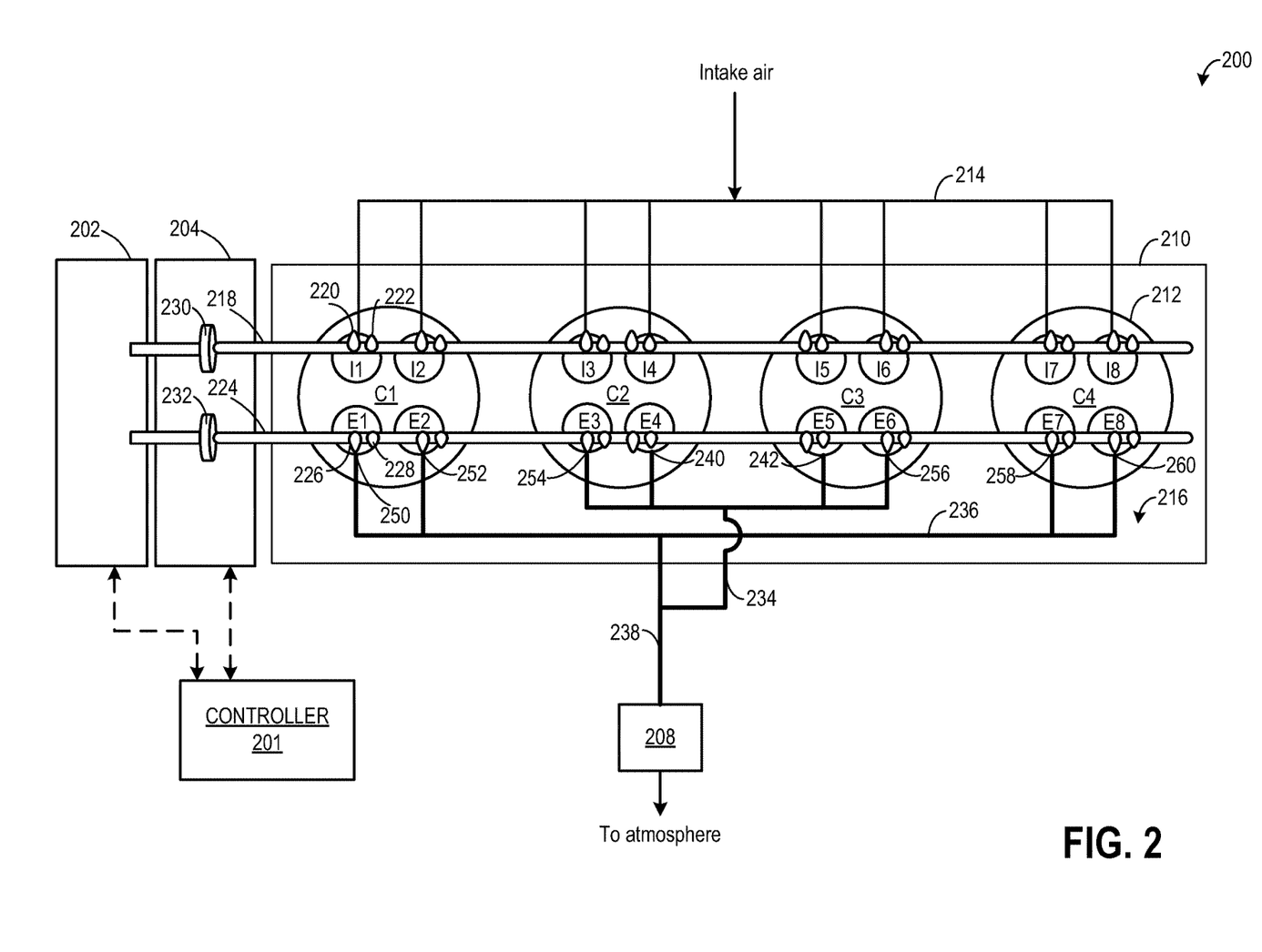
FIG. 2 shows an alternate embodiment of the engine of FIG. 1.

FIG. 2 shows an example embodiment of an engine 200, which may be engine 10 of FIG. 1, wherein exhaust from different groups of cylinders are directed to different exhaust passages of a segmented exhaust manifold. The different exhaust passages may merge at a downstream location of the exhaust manifold, at or around an emission control device.

Engine 200 includes a variable cam timing (VCT) system 202, a cam profile switching (CPS) system 204, an emission control device 208 including an exhaust catalyst, and a cylinder head 210 with a plurality of cylinders 212 (in the depicted example, four in-line cylinders C1-C4 are illustrated). Intake manifold 214 is configured to supply intake air and/or fuel to the cylinders 212 and a segmented integrated exhaust manifold 216 is configured to exhaust the combustion products from the cylinders 212. Segmented exhaust manifold 216 may include a plurality of exhaust passages, or outlets, each coupled to the emission control device at different locations along segmented exhaust manifold 216. In a further embodiment, the different outlets may be coupled to different exhaust components. While the depicted embodiment shows intake manifold 214 being separate from cylinder head 210 and exhaust manifold 216 being integrated in cylinder head 210, in other embodiments, intake manifold 214 may be integrated and/or exhaust manifold 216 may be separate from cylinder head 210.

Cylinder head 210 includes four cylinders, labeled C1-C4. Cylinders 212 may each include a spark plug and a fuel injector for delivering fuel directly to the combustion chamber, as described above in FIG. 1. However, in alternate embodiments, each cylinder may not include a spark plug and/or direct fuel injector. Cylinders may each be serviced by one or more valves. In the present example, cylinders 212 each include two intake valves and two exhaust valves. Each intake and exhaust valve is configured to open and close an intake port and exhaust port, respectively. The intake valves are labeled I1-I8 and the exhaust valves are labeled E1-E8. Cylinder C1 includes intake valves I1 and I2 and exhaust valves E1 and E2; cylinder C2 includes intake valves I3 and I4 and exhaust valves E3 and E4; cylinder C3 includes intake valves I5 and I6 and exhaust valves E5 and E6; and cylinder C4 includes intake valves I7 and I8 and exhaust valves E7 and E8. Each exhaust port of each cylinder may be of equal diameter. However, in some embodiments, some of the exhaust ports may be of different diameter. For example, the exhaust ports controlled by exhaust valves E4 and E5 may be of smaller diameter than the remaining exhaust ports.

Each intake valve is actuatable between an open position allowing intake air into a respective cylinder and a closed position substantially blocking intake air from the respective cylinder. Further, FIG. 2 shows how intake valves I1-I8 may be actuated by a common intake camshaft 218. Intake camshaft 218 includes a plurality of intake cams configured to control the opening and closing of the intake valves. Each intake valve may be controlled by first intake cams 220 and second intake cams 222. Further, in some embodiments, one or more additional intake cams may be included to control the intake valves. In the present example, first intake cams 220 have a first cam lobe profile for opening the intake valves for a first intake duration while second intake cams 222 have a second cam lobe profile for opening the intake valve for a second intake duration. The second intake duration may be a shorter intake duration (shorter than the first intake duration), the second intake duration may be a longer intake duration (longer than the first duration), or the first and second duration may be equal. Additionally, intake camshaft 218 may include one or more null cam lobes. Null cam lobes may be configured to maintain respective intake valves in the closed position.

Likewise, each exhaust valve is actuatable between an open position allowing exhaust gas out of a respective cylinder of the cylinders 212 and a closed position substantially retaining gas within the respective cylinder. Further, FIG. 2 shows how exhaust valves E1-E8 may be actuated by a common exhaust camshaft 224. Exhaust camshaft 224 includes a plurality of exhaust cams configured to control the opening and closing of the exhaust valves. Each exhaust valve may be controlled by first exhaust cams 226 and second exhaust cams 228. Further, in some embodiments, one or more additional exhaust cams may be included to control the exhaust valves. In the present example, first exhaust cams 226 have a first cam lobe profile for opening the exhaust valves for a first exhaust duration while second exhaust cams 228 have a second cam lobe profile for opening the exhaust valve for a second exhaust duration. The second exhaust duration may be a shorter, longer, or equal to the first exhaust duration. Additionally, exhaust camshaft 224 may include one or more null cam lobes configured to maintain respective exhaust valves in the closed position.

Additional elements not shown may further include push rods, rocker arms, tappets, etc. Such devices and features may control actuation of the intake valves and the exhaust valves by converting rotational motion of the cams into translational motion of the valves. In other examples, the valves can be actuated via additional cam lobe profiles on the camshafts, where the cam lobe profiles between the different valves may provide varying cam lift height, cam duration, and/or cam timing. However, alternative camshaft (overhead and/or pushrod) arrangements could be used, if desired. Further, in some examples, cylinders 212 may each have only one exhaust valve and/or intake valve, or more than two intake and/or exhaust valves. In still other examples, exhaust valves and intake valves may be actuated by a common camshaft. However, in an alternate embodiment, at least one of the intake valves and/or exhaust valves may be actuated by its own independent camshaft or other device.

A subset of the exhaust valves of cylinders 212 may be deactivated, if desired, via one or more mechanisms. For example, exhaust valves E3-E6, which are coupled to exhaust manifold segment 234 (explained in more detail below) may be deactivated via switching tappets, switching rocker arms, or switching roller finger followers. During modes where variable displacement engine operation (VDE) is activated, the intake valves may be deactivated utilizing similar mechanisms. Alternatively, the cylinders may be configured with selectively deactivatable fuel injectors wherein the fuel injectors are selectively deactivated (while maintaining intake and exhaust valve timing) during VDE mode of operation to provide cylinder deactivation.

Engine 200 may include variable valve actuation systems, for example CPS system 204, and variable cam timing VCT system 202. A variable valve actuation system may be configured to operate in multiple operating modes based on engine operating conditions, such as based on whether the engine is performing a cold engine start, a warmed-up engine operation, engine speed-load conditions, etc. Based on the mode of operation, the variable valve actuation system may be configured to open only a subset of exhaust ports of a subset of cylinders, with all other exhaust ports closed. Additionally, the variable valve actuation system may be configured to selectively open and close the intake ports in correspondence to the opening and closing of the exhaust ports during the various operating modes.

CPS system 204 may be configured to translate specific portions of intake camshaft 218 longitudinally, thereby causing operation of intake valves I1-I8 to vary between first intake cams 220 and second intake cams 222 and/or other intake cams. Further, CPS system 204 may be configured to translate specific portions of exhaust camshaft 224 longitudinally, thereby causing operation of exhaust valves E1-E8 to vary between first exhaust cams 226 and second exhaust cams 228 and/or other exhaust cams. In this way, CPS system 204 may switch between multiple profiles. In doing so, the CPS system 204 may switch between a first cam, for opening a valve for a first duration, a second cam, for opening the valve for a second duration, and/or additional or null cams. CPS system 204 may be controlled via signal lines by controller 201 (controller 201 is one non-limiting example of controller 12 of FIG. 1).

The configuration of cams described above may be used to provide control of the amount and timing of air supplied to, and exhausted from, the cylinders 212. However, other configurations may be used to enable CPS system 204 to switch valve control between two or more cams. For example, a switchable tappet or rocker arm may be used for varying valve control between two or more cams.

Engine 200 may further include VCT system 202. VCT system 202 may be a twin independent variable camshaft timing system, for changing intake valve timing and exhaust valve timing independently of each other. VCT system 202 includes intake camshaft phaser 230 and exhaust camshaft phaser 232 for changing valve timing. VCT system 202 may be configured to advance or retard valve timing by advancing or retarding cam timing (an example engine operating parameter) and may be controlled via signal lines by controller 201. VCT system 202 may be configured to vary the timing of valve opening and closing events by varying the relationship between the crankshaft position and the camshaft position. For example, VCT system 202 may be configured to rotate intake camshaft 218 and/or exhaust camshaft 224 independently of the crankshaft to cause the valve timing to be advanced or retarded. In some embodiments, VCT system 202 may be a cam torque actuated device configured to rapidly vary the cam timing. In some embodiments, valve timing such as intake valve closing (IVC) and exhaust valve closing (EVC) may be varied by a continuously variable valve lift (CVVL) device. The valve/cam control devices and systems described above may be hydraulically powered, or electrically actuated, or combinations thereof. Signal lines can send control signals to and receive a cam timing and/or cam selection measurement from CPS system 204 and VCT system 202.

Returning to exhaust manifold 216, it may be configured with multiple outlets to selectively direct exhaust gas from different groups of cylinders to different locations along the exhaust manifold (e.g., to various exhaust components). While the depicted example shows exhaust manifold 216 to be a single, integrated exhaust manifold that includes multiple outlets, in other embodiments, cylinder head 210 may include multiple separate and physically distinct exhaust manifolds, each having one outlet. Furthermore, the separate exhaust manifolds may be included in a common casting in cylinder head 210. In the embodiment of FIG. 2, exhaust manifold 216 includes a first exhaust manifold segment 234 and a second exhaust manifold segment 236 coupled to a common exhaust passage 238.

First exhaust manifold segment 234 couples a subset of exhaust ports of a subset of the cylinders to the emission control device 208. As shown in FIG. 2, the exhaust ports of exhaust valves E3-E6 of cylinders C2 and C3, respectively, are coupled to the first exhaust manifold segment 234. First exhaust manifold segment 234 includes inlets 240, 254 coupled to the exhaust ports controlled by exhaust valves E3 and E4, respectively and inlets 242, 256 coupled to the exhaust ports controlled by exhaust valves E5 and E6, respectively. Further, exhaust from first exhaust manifold segment 234 is directed into exhaust passage 238 upstream of emission control device 208. Thus, when exhaust valves E3-E6 are opened, exhaust is directed from cylinders C2 and C3 to the exhaust passage 238 through the first exhaust manifold segment 234 on to emission control device 208.

Second exhaust manifold segment 236 couples a different subset of the cylinders to the exhaust passage 238. As shown in FIG. 2, the exhaust ports of exhaust valves E1-E2, and E7-E8 of cylinders C1 and C4, respectively, are coupled to second exhaust manifold segment 236. Second exhaust manifold segment 236 includes inlets 250, 252 coupled to the exhaust ports controlled by exhaust valves E1 and E2, respectively and inlets 258, 260 coupled to the exhaust ports controlled by exhaust valves E7 and E8, respectively. Further, exhaust from second exhaust manifold segment 236 is directed into exhaust passage 238 upstream of emission control device 208, and upstream of a point where first exhaust manifold 234 merges with exhaust passage 238. Thus, when exhaust valves E1-E2 and E7-E8 are opened, exhaust is directed from cylinders C1 and C4 to the exhaust passage 238 through the second exhaust manifold segment 236 on to emission control device 208.

In some embodiments, the first and second exhaust manifold segments may be coupled to different exhaust components. For example, one of the exhaust manifold segments may be coupled upstream of an exhaust turbine while the other exhaust manifold segment may be coupled downstream of the exhaust turbine. As another example, while the depicted embodiment shows each of the exhaust manifold segments coupled upstream of the emission control device, in an alternate embodiment, one of the exhaust manifold segments may be coupled upstream of an emission control device catalyst while the other exhaust manifold segment may be coupled downstream of the emission control device catalyst.

Grouping of cylinders may be based on various factors such as a firing order, a location of the cylinders on the engine based on the specific engine configuration (e.g., whether they are positioned on a first engine bank or a second engine bank), as well as a configuration of the exhaust manifold (e.g., whether the exhaust manifold is segmented, integrated, etc.). In the depicted example, the engine is an in-line engine and the cylinders are grouped based on their firing order (herein, C1, then C3, then C4, then C2) such that no two consecutively firing cylinders are grouped together (herein, C1 is grouped with C4 while C2 is grouped with C3). However, in alternate embodiments, consecutively firing cylinder may be grouped together. In another example, cylinders on a first engine bank may be grouped with each other while cylinders on a second bank may be grouped with each other.

By segmenting the exhaust manifold so that exhaust from different groups of cylinders are directed to different exhaust manifold segments, and to different locations along an exhaust passage, improved pumping work and reduced flow losses can be achieved.

As described above, FIG. 2 shows a non-limiting example of an internal combustion engine and associated intake and exhaust systems. It should be understood that in some embodiments, the engine may have more or less combustion cylinders, control valves, throttles, and compression devices, among others. Example engines may have cylinders arranged in a "V" configuration. Further, a first camshaft may control the intake valves for a first group or bank of cylinders and a second camshaft may control the intake valves for a second group of cylinders. In this manner, a single CPS system and/or VCT system may be used to control valve operation of a group of cylinders, or separate CPS and/or VCT systems may be used.

As such, based on the configuration of an engine, including an engine exhaust manifold, as well as a firing order of cylinders in the engine, exhaust residuals generated during combustion in a cylinder may be received in another cylinder. Further, based on valve timings of the various cylinders, exhaust residuals from a cylinder undergoing an exhaust stroke may be unintentionally received in another cylinder concurrently undergoing an intake stroke. In particular, in engines configured with small exhaust manifolds (to address turbo lag issues), the release of a large amount of exhaust residuals into a common exhaust manifold can lead to elevated exhaust manifold pressures. The elevated exhaust manifold pressure can, in turn, overcome the exhaust valve spring pressure of a cylinder, forcing exhaust residuals from the combusting cylinder into one or more neighboring cylinders. When the exhaust valve subsequently slams shut, a characteristic ringing may occur which can be detected based on sensed engine block vibrations and distinguished from vibrations generate due to knocking and pre-ignition events based on differences in frequency content of the vibrations. Applicants have recognized that if the temperature and pressure of the exhaust residuals is sufficiently elevated, when received in a neighboring cylinder, the hot residuals may increase the recipient cylinder's propensity for pre-ignition.

As an example, during transient torque requests (e.g., in response to a sudden drop in torque demand), torque control may be achieved by modifying engine parameters from nominal settings and retarding spark ignition timing. While the spark retard allows substantially immediate torque reduction to be achieved, the late combustion event generates hot exhaust residuals. When received in a first recipient cylinder, the hot residuals may not only increase the likelihood of pre-ignition in the first recipient cylinder, but may also raise the temperature of residuals generated in the first recipient cylinder such that when combustion occurs in that cylinder, a second recipient cylinder (likely to receive exhaust residuals from the first recipient cylinder) may also receive hot residuals and may pre-ignite. Thus, a cascading pre-ignition event can occur than can rapidly degrade the engine.

Figure 3:
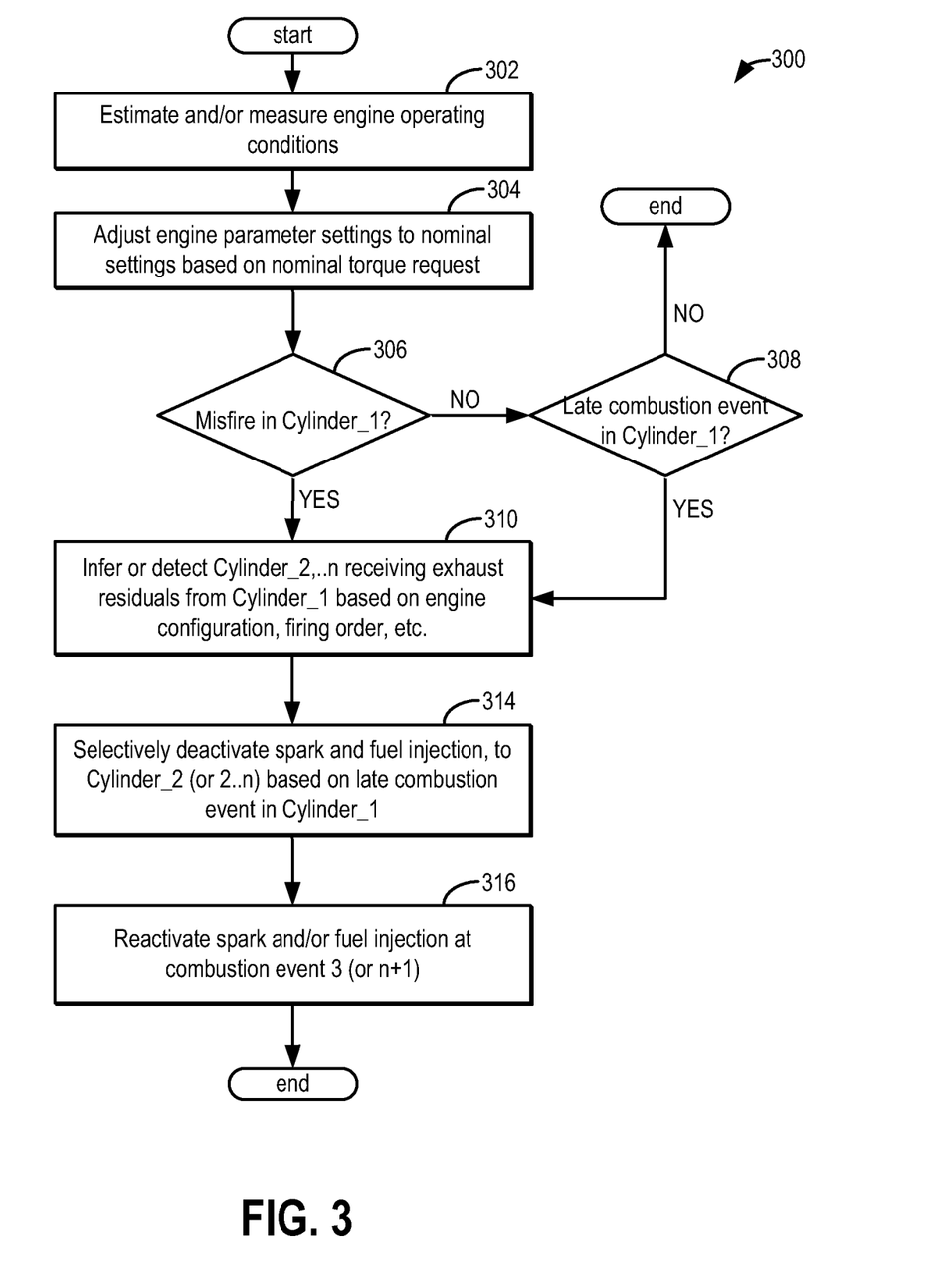
FIG. 3 shows a high level flow chart for performing a pre-ignition mitigating action in one or more cylinders responsive to late combustion in a neighboring cylinder.

As elaborated at FIG. 3, an engine controller may be configured to identify a late combustion event and/or engine misfire event based on engine parameters. The misfire may be based on engine speed fluctuations from inadvertent reductions in torque due to the incomplete burning of the air and fuel at the appropriate time in the expansion stroke, and/or based on exhaust air fuel ratio sensor indications that exhaust is temporarily and inadvertently leaner than expected (due to a much higher level of O2 than there is unburned hydrocarbons). In response to the late combustion event or engine misfire, the controller may pre-empt the pre-ignition by performing a pre-ignition mitigating action in one or more cylinders that are likely to be affected by the late combustion event. For example, the pre-ignition mitigating action may include deactivating fuel injection to the affected cylinder. In another example, the pre-ignition mitigating action may further include deactivating spark while also deactivating fuel injection to the affected cylinder. In some examples, the controller may additionally detect that a cylinder exhaust valve has been forced open due to the entry of hot residuals from a late combustion event based on output from an engine knock sensor. Additionally air mass flow rates could be used to know when the engine was at high enough loads to produce pressures high enough to unseat the exhaust valves from the corresponding late burns. By more accurately identifying the cylinder where the exhaust valve was forced open, pre-ignition mitigating actions may be appropriately performed.

In this way, the engine systems of FIGS. 1-2 provide for an engine system comprising: an engine, a spark plug coupled to each engine cylinder, and a direct fuel injector coupled to each engine cylinder. The engine system further comprises a controller configured with computer readable instructions on non-transitory memory for: in response to timing of combustion in a first cylinder being retarded from a threshold timing, selectively deactivating spark to a second cylinder receiving exhaust residuals from the combustion in the first cylinder. The controller includes further instructions for selectively deactivating fuel to the second cylinder in response to the timing of combustion in the first cylinder being retarded from the threshold timing. Additionally, the controller includes further instructions for: reactivating fuel and spark ignition to a third cylinder receiving exhaust residuals from combustion in the second cylinder. Each of the second cylinder and third cylinder are selected based on an identity of the first cylinder and a firing order of the engine.

Now turning to FIG. 3, an example routine 300 is depicted for performing a pre-ignition mitigating action in one or more cylinders in response to a late combustion event or misfire in a given cylinder. By deactivating spark to one or more cylinders receiving hot exhaust residuals from combustion in the given cylinder, effective temperatures of the received residuals may be lowered, reducing the likelihood of late-burn induced pre-ignition events. Continuing fueling during the spark deactivation may further reduce the effective temperatures of the received residuals. By disabling both spark and fueling, pre-ignition is pre-empted.

At 302, the routine includes estimating and/or measuring engine operating conditions. These include, for example, engine speed and load, torque demand, boost, manifold pressure (MAP), manifold aircharge temperature (MCT), air-fuel ratio (lambda), fuel alcohol content, barometric pressure, ambient conditions (e.g., ambient temperature, pressure, humidity, etc.), engine pre-ignition history, etc. At 304, engine parameter settings may be adjusted based on the estimated engine operating conditions. For example, based on a nominal torque request, engine parameter settings of boost, valve timing, spark ignition timing, etc., may be set to nominal settings. As an example, spark timing may be set to MBT or borderline spark.

Different engine events and resulting engine operating condition adjustments may lead to a late combustion event or misfire event wherein cylinder combustion occurs at a time or crank angle location that is later than was intended (that is, later than would occur if the engine parameter settings were maintained at the nominal settings). In some engine configurations, such as with a boosted engine, the late combustion may be much later than intended. For example, spark retard may be used to quickly reduce torque when needed. However, retarding spark in this way may cause late combustion burning cycles in the engine.

The late combustion in a cylinder, as well as cylinder misfire, can lead to the generation of hot exhaust residuals in the cylinder, as well as high exhaust manifold pressures. If a large amount of hot residuals are generated in the cylinder, the residuals can lead to abnormal combustion events, such as misfires and/or pre-ignition events, in one or more neighboring cylinders. Specifically, the large amount of hot residuals can be received in a neighboring cylinder during the valve overlap period. Alternatively, or additionally, the hot residuals can force open the exhaust valve of a neighboring cylinder. In particular, the hot residuals can elevate the exhaust manifold pressure to levels that cause a neighboring cylinder exhaust valve spring pressure to be overcome, forcing the hot exhaust residuals into the neighboring cylinder. In either case, the hot residuals can substantially raise the temperature in the cylinder receiving the residuals, and make that cylinder prone to pre-ignition. Thus, at 306, it is determined if there is a misfire in one or more of the cylinders. Specifically, based on engine operating conditions, if may be determined if there is a misfire in a first cylinder (Cylinder_1). In one example, the cylinder misfire (or partial burn) is based on crankshaft acceleration. In another example, the cylinder misfire is based on an exhaust air-fuel ratio, for example, based on the output of an exhaust gas oxygen sensor (e.g., UEGO sensor). In still another example, the cylinder misfire is based on spark plug ionization (e.g., ionization current) as determined by an ionization sensor coupled to the spark plug. For example, during misfire events, an exhaust oxygen sensor may read lean if there is a misfire/partial burn due to the presence of excess oxygen in the exhaust that was not consumed during the combustion process. Thus, a misfire may be indicated based on the output of the exhaust gas oxygen sensor being leaner than a threshold. In still other examples, a misfire may be determined based on changes in in-cylinder pressure as estimated by an in-cylinder pressure sensor.

If a misfire is not detected at 306, the method continues to 308 to determine if there is a late combustion event. In particular, based on the engine operating conditions, it may be determined if there is a late combustion event in the first cylinder (Cylinder_1). In one example, the late combustion event in the first cylinder is inferred based on one or more of the cylinder's (intake and/or exhaust) valve timing, spark timing, spark plug ionization current, crankshaft acceleration, exhaust temperature, and cylinder pressure. For example, a late combustion may be determined in response to a combustion timing of the cylinder being retarded from a threshold timing. The threshold timing may be based on a location of peak pressure during the combustion event in the first cylinder. As another example, the threshold timing may be based on a location where a threshold mass fraction of burned fuel remains in the first cylinder. As an example, the threshold timing may include a timing that results in 50% mass fraction being burned at locations later than 35 degrees after TDC. This may include an intake and/or exhaust valve timing of combustion in the first cylinder being retarded from a threshold valve timing and/or a spark timing of combustion in the first cylinder being retarded from a threshold spark timing (e.g., from MBT).

Upon confirming a misfire or late combustion event in the first cylinder, the method continues on to 310. Specifically, at 310, the method includes determining which cylinder is receiving exhaust residuals from the late burn event in the first cylinder. This may include inferring (or identifying) a second cylinder (Cylinder_2) that will receive (or is receiving) exhaust residuals from the combustion in the first cylinder based at least on an identity of the first cylinder and a firing order of the engine. For example, in a four cylinder in-line engine having consecutively positioned cylinders numbered 1 through 4, and wherein a firing order of the cylinders includes cylinder number 1 firing first, followed by cylinder number 3, then cylinder number 4 and finally cylinder number 2, it may be determined which of cylinders 1-4 incurred the late combustion to identify which cylinder will most likely receive the hot exhaust residuals. Herein, if cylinder number 1 is the first cylinder incurring the late combustion, cylinder number 2 is most likely to receive the exhaust residuals since cylinder number 2 will be in an intake stroke (providing least resistance to the entry of residuals) when cylinder number 1 is in the exhaust stroke, while the other cylinders will be in power or compression strokes (providing higher resistance to the entry of residuals). However, if cylinder number 4 is the first cylinder incurring the late combustion, cylinder number 3 will most likely receive the exhaust residuals since cylinder number 3 will be in an intake stroke (providing least resistance to the entry of residuals) when cylinder number 4 is in the exhaust stroke. As such, the identity of the cylinder receiving residuals would be different if the engine was a 6-cylinder in-line engine, or if the engine was a four cylinder V-shaped engine with different cylinders of different engine banks. In one example, where the engine has different groups of cylinders on different banks, the first cylinder undergoing the late combustion and the second cylinder receiving the exhaust residuals may be located on a common engine bank.

In some embodiments, the second cylinder may be further identified based on an exhaust manifold configuration. For example, the identity of the second cylinder may be based on whether the exhaust manifold was integrated or segmented (such as the segmented exhaust manifold in the engine system of FIG. 2). As an example, if the exhaust manifold is segmented, it may be determined which cylinders are grouped to a common exhaust manifold segment such that they discharge exhaust through a common conduit. Herein, the first cylinder undergoing the late combustion and the second cylinder receiving the exhaust residuals may be coupled to the common exhaust manifold, even if located at different positions on the engine.

In other embodiments, the controller may determine which cylinder received the exhaust residuals by utilizing the system knock sensors coupled along the engine block to detect if an exhaust valve has been forced open. In particular, after an exhaust valve of a neighboring cylinder is forced open at high pressure, the exhaust valve slams into the exhaust seat upon return. This slamming occurs because the exhaust valve is on the base circle of the camshaft, and is not following the exhaust cam profile for that particular cylinder in the bank of cylinders. When the slamming occurs it generates vibrations which cause the knock sensors to resonate. By knowing which cylinder on the bank recently fired (late), and which exhaust valves on the bank of cylinders are on the base circle, it is possible for the controller to window where the vibration occurred. This information along with the sensor output properly filtered in the correct frequency spectrum enables the controller to identify which cylinder received the unintended hot residual. Additionally, air mass flow rates could be used to know when the engine was at high enough loads to produce pressures high enough to unseat the exhaust valves from the corresponding late burns. In one example, in response to a sensed block vibration in a window during an open exhaust valve of a first cylinder undergoing a late combustion event and after exhaust valve closing of a second cylinder, the controller may infer that the second cylinder received unintended hot residuals from the first cylinder and accordingly perform a pre-ignition mitigating action in the second cylinder.

In some embodiments, one or more cylinders that will be progressively affected by the residuals generated in the first cylinder may be identified. For example, in addition to identifying a second cylinder receiving (or most likely to receive) exhaust residuals from the first cylinder, a third cylinder likely to receive residuals from the second cylinder may also be identified. This is because the hot residuals received in the second cylinder may not only cause the second cylinder to potentially pre-ignite, but the received hot residuals may also lead to elevated exhaust temperatures upon combustion in the second cylinder, which can force hot residuals into the third cylinder and increase the third cylinder's propensity for pre-ignition.

Upon identifying the second cylinder, the routine includes performing a pre-ignition mitigating action in the second cylinder receiving the exhaust residuals from the first cylinder (e.g., by adjusting fuel injection to the second cylinder). Upon identifying the second cylinder, the routine includes performing a pre-ignition mitigating action in the second cylinder receiving the exhaust residuals from the first cylinder (e.g., by adjusting fuel injection to the second cylinder). Specifically, at 314, the routine includes selectively deactivating spark ignition and fuel injection to the second cylinder.

In some examples, the engine controller may selectively deactivate fuel injection and not deactivate spark. For example, spark may continue without fuel injection in the second cylinder. The selection may be based on the timing of combustion in the first cylinder releasing the exhaust residuals as well as the propensity for pre-ignition of the second (or third and so forth) cylinder receiving the exhaust residuals. As an example, in response to a (first) timing of combustion in the first cylinder being retarded from a threshold timing by a first smaller amount, the controller may selectively deactivate only fuel or only spark to a second cylinder receiving exhaust residuals from the combustion in the first cylinder. In comparison, in response to a (second) timing of combustion in the first cylinder being retarded from the threshold timing by a second larger amount, the controller may selectively deactivate each of spark ignition and fuel to the second cylinder.

At 316, the method includes reactivating spark and/or fuel injection during subsequent combustion events. That is, spark and/or fuel injection may be selectively deactivated to the second cylinder for only one combustion cycle. For example, the method at 316 may include reactivating spark and/or fuel injection during combustion at a third cylinder receiving exhaust residuals from combustion in the second cylinder. In this way, the method may only deactivate spark and/or fuel injection at the second cylinder and not in additional cylinders unless pre-ignition is expected in the additional cylinders.

By performing a pre-ignition mitigating action in the second cylinder, various advantages are achieved. First, the selective spark and/or fuel deactivation is performed to reduce pre-ignition in the second cylinder. In addition, pre-ignition is mitigated in a third cylinder that would have received exhaust residuals from the second cylinder.

In some embodiments, in addition to performing the pre-ignition mitigating action in the second cylinder, a pre-ignition mitigating action may also be performed in the third cylinder. As one example, in response to a timing of combustion in a first cylinder being later than a threshold, the engine controller may selectively deactivate spark and/or fuel injection to the second cylinder receiving exhaust residuals from the first cylinder as well as selectively deactivating spark and/or fuel injection to the third cylinder expected to receive exhaust residuals from the second cylinder. As another example, the engine controller may selectively deactivate spark and fuel injection to the second cylinder receiving exhaust residuals from the first cylinder as well as selectively deactivating fuel injection (with or without deactivating spark) to the third cylinder expected to receive exhaust residuals from the second cylinder. As such, the pre-ignition mitigating action is performed before receiving an indication of pre-ignition in each of the first, second, and third cylinders. Spark and/or fuel may then be reactivated at the subsequent combustion event. For example, spark and/or fueling may be reactivated at a combustion event in a fourth cylinder firing after the third cylinder. As another example, if n cylinders have spark and/or fuel deactivated, spark and fuel may be reactivated at the n+1th combustion event.

In the depicted embodiment, the controller may continuously monitor misfire and late combustion events in all engine cylinders under all conditions and perform mitigating actions in response to any cylinder late combustion event or misfire. In alternate embodiments, the controller may only perform the pre-ignition mitigating actions (e.g., deactivating spark and fuel injection) when engine load is over a threshold, thereby indicating a risk for pre-ignition. In still other embodiments, the controller may look at late combustion events in high air mass flow regions where the exhaust manifold volume comes more into play.

Further still, in some embodiments, after inferring which cylinder (the recipient cylinder) is receiving exhaust residuals from the late burn event in the first cylinder (the donor cylinder), the controller may first determine if the likelihood of pre-ignition in the recipient cylinder is higher than a threshold. The likelihood of pre-ignition may be based on the recipient cylinder's pre-ignition history and parameters of combustion in the donor cylinder (such as combustion air-fuel ratio, timing of combustion, in-cylinder combustion temperature and pressure, expected temperature and air-fuel ratio of exhaust residuals, mass of unburned fuel remaining in the donor cylinder, mass of unburned fuel likely to be ingested into the recipient cylinder, etc.). If the likelihood of pre-ignition is determined to be higher, the engine controller may deactivate fuel and spark to the recipient cylinder. Else, the controller may deactivate only one of spark and fuel to the recipient cylinder.

As such, the exhaust residuals received may be richer or leaner than stoichiometry. For example, during misfire events, an exhaust oxygen sensor may read lean if there is a misfire/partial burn due to the presence of excess oxygen in the exhaust that was not consumed during the combustion process. However, the presence of unburned fuel in the donor cylinder generates a combustion mixture with high temperatures which when ingested in the recipient cylinder, can have the effect of a hot intake aircharge.

In this way, by adjusting spark timing and fuel injection to one or more cylinders receiving, directly or indirectly, a large amount of hot exhaust residuals from a late combustion event in a neighboring cylinder, late burn induced pre-ignition events may be better anticipated and mitigated.

In this way, a method for an engine comprises in response to misfire in a first cylinder, selectively deactivating spark ignition to a second cylinder receiving exhaust residuals from combustion in the first cylinder. In one example, the combustion in the first cylinder is a slow combustion and a timing of the combustion in the first cylinder is retarded from a threshold timing. Further, the timing of combustion in the first cylinder includes spark timing, intake valve timing and/or exhaust valve timing of combustion in the first cylinder.

The method further comprises deactivating fuel to the second cylinder. In one example, the second cylinder is identified based on an identity of the first cylinder and a firing order of the engine. In another example, the second cylinder is further identified based on an exhaust manifold configuration. In some examples, the exhaust residuals received in the second cylinder may include unburned fuel mass due to partial burn of fuel in the first cylinder. The heating of the combustion mixture in the first cylinder results in extremely high intake aircharge temperatures when the residuals are received in the second cylinder, increasing the propensity for pre-ignition. When a larger unburned fuel mass is left in the first cylinder, both fuel injection and spark are disabled in the second cylinder.

In one example, the selectively deactivating spark ignition is performed before receiving an indication of pre-ignition in the second cylinder. The method may further comprise selectively deactivating spark ignition and fueling to a third cylinder receiving exhaust residuals from combustion in the second cylinder. The method may further include reactivating spark ignition during combustion in a third cylinder firing after the second cylinder.

Figure 4:
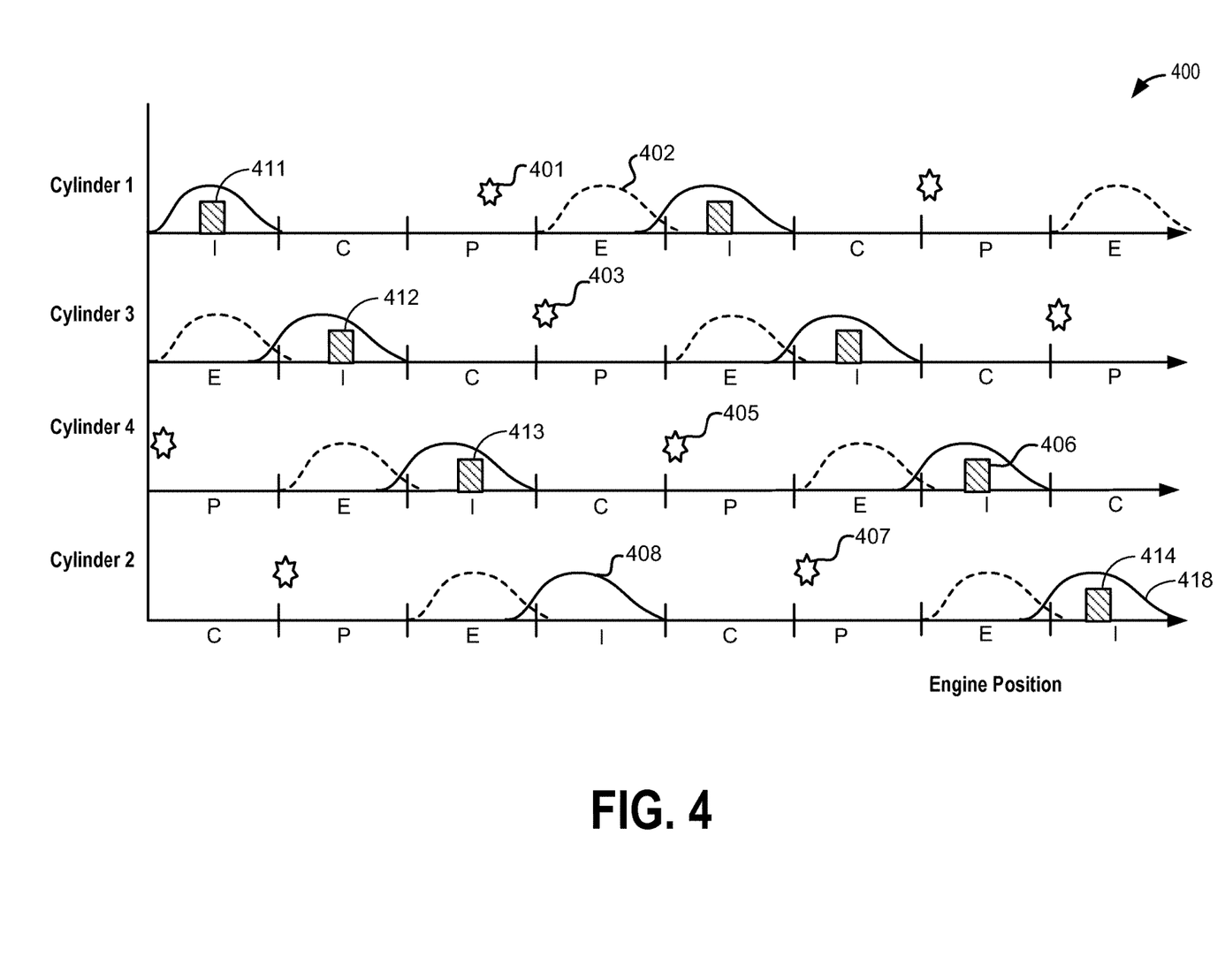
FIGS. 4-5 show example engine spark timing and fuel injection adjustments performed in response to a cylinder misfire or late combustion event.
Figure 5:
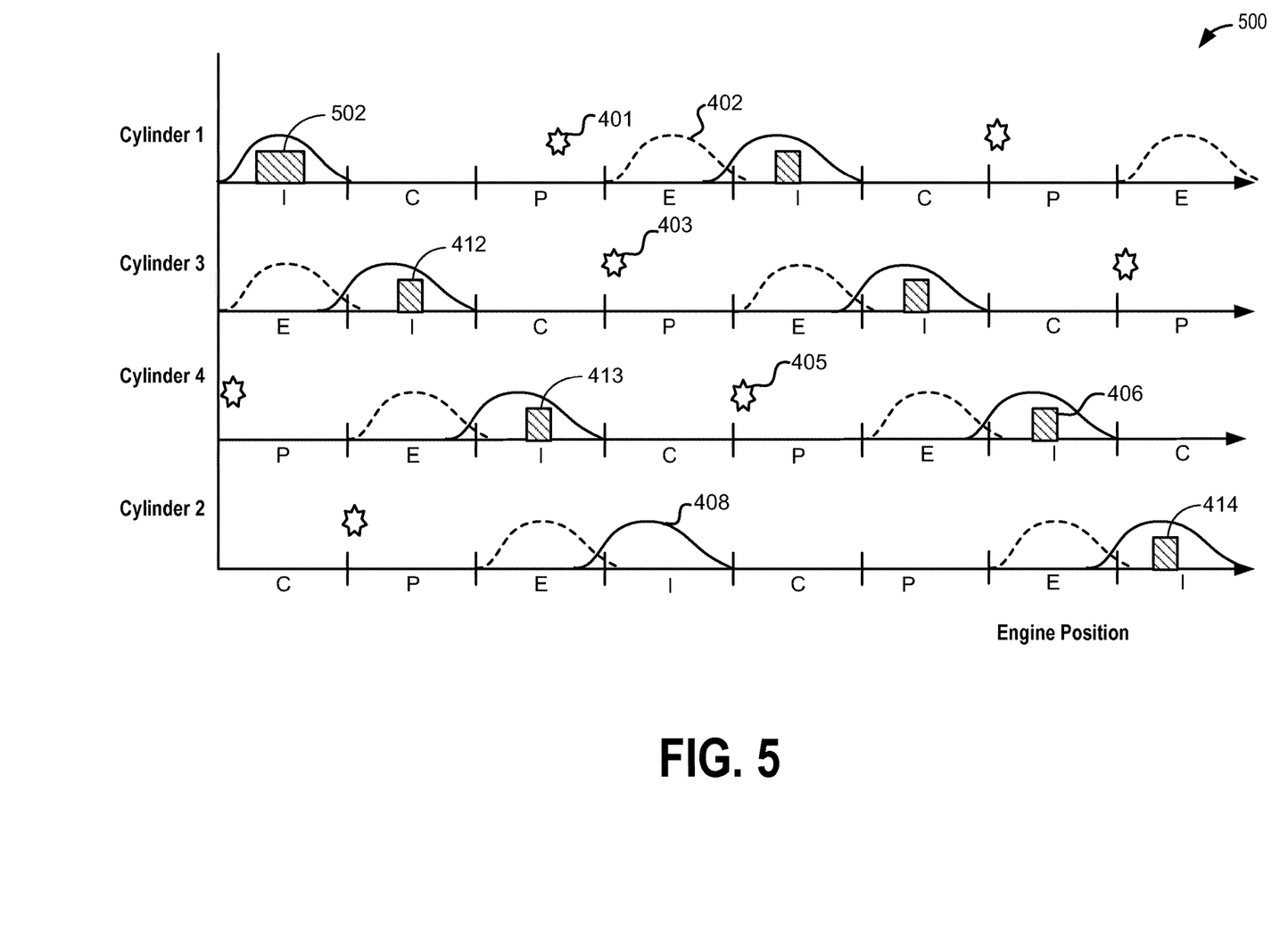

FIGS. 4-5 show example engine spark timing and fuel injection adjustments performed in response to a cylinder misfire or late combustion event. FIG. 4 shows a first example of deactivating fuel injection to a second cylinder receiving exhaust residuals from a first cylinder which experienced misfire or late combustion. FIG. 5 shows a second example of deactivating spark and fuel injection to a second cylinder receiving exhaust residuals from a first cylinder which experienced misfire or late combustion.

Turning first to FIG. 4, a map 400 shows a four cylinder in-line engine having cylinders 1-4 arranged consecutively along an engine block (not shown), wherein cylinders 1-4 are configured to fire in the order 1-3-4-2. Map 400 depicts intake valve timings (solid line) and exhaust valve timings (dashed line) with respect to engine piston position being in an intake stroke (I), exhaust stroke (E), power stroke (P) or compression stroke (C). Map 400 further depicts cylinder spark ignition events by stars 401, 403, 405, 407 and cylinder fuel injection events by rectangles 411, 412, 413, and 414.

The first plot from the top of the figure represents position of cylinder number one (cylinder 1). And, in particular, the stroke of cylinder number one as the engine crankshaft is rotated. Cylinder 1 strokes are labeled according to the engine position. For example, cylinder 1 is shown first in an intake stroke (I), the engine rotates and cylinder number one enters the compression stroke (C) followed by power (P) and exhaust (E) strokes. The cylinder cycle for cylinder 1 then repeats. For a four stroke engine a cylinder cycle may be 720°, the same crankshaft interval for a complete cycle of the engine.

The second plot from the top of the figure, likewise represents position of cylinder number three (cylinder 3), in particular, the stroke of cylinder number three as the engine crankshaft is rotated. Cylinder 3 strokes are labeled according to the engine position. For example, Cylinder 3 is shown first in an exhaust stroke (E), the engine rotates and cylinder number three enters the intake stroke (I), followed by compression (C) and power (P) strokes. The cylinder cycle for Cylinder 3 then repeats. The third plot from the top of the figure, likewise represents position of cylinder number four (cylinder 4), in particular, the stroke of cylinder number four as the engine crankshaft is rotated. Cylinder 4 strokes are labeled according to the engine position. For example, Cylinder 4 is shown first in power stroke (P), the engine rotates and cylinder number four enters the exhaust stroke (E), followed by intake (I) and compression (C) strokes. The cylinder cycle for Cylinder 4 then repeats. The fourth plot from the top of the figure, likewise represents position of cylinder number two (Cylinder 2), in particular, the stroke of cylinder number two as the engine crankshaft is rotated. Cylinder 2 strokes are labeled according to the engine position. For example, Cylinder 2 is shown first in a compression stroke (C), the engine rotates and cylinder number two enters the power stroke (P), followed by exhaust (E) and intake (I) strokes. The cylinder cycle for Cylinder 2 then repeats.

The star at label 401 indicates the ignition event for a first combustion event in cylinder 1. The ignition may be initiated by a spark plug. In this sequence, cylinder number one valves are open for at least a portion of the intake stroke to provide air to the cylinder. Fuel may be injected to the engine cylinders by port or direct injectors. The fuel and air mixture are compressed and ignited during the compression stroke. Peak cylinder pressure may occur at top-dead-center of compression stroke or during the expansion stoke. Subsequent combustion events in cylinders 3, 4, and 2 are shown at 403, 405, and 407, in that order.

In the depicted example, the spark ignition event 401 in Cylinder 1 occurs with spark retard such that the ignition event is delayed later into the power stroke (e.g., late combustion event). As a result of the late combustion event, a large amount of hot exhaust residuals are discharged from Cylinder 1 during the exhaust stroke when the exhaust valve open (plot 402). Due to the configuration of the engine, cylinder number two (Cylinder 2) is in an intake stroke (plot 408) at the same time as Cylinder 1 is in exhaust stroke (plot 402), providing relatively less resistance to the entry of residuals. In comparison, cylinder number three (Cylinder 3) and cylinder number four (Cylinder 4) are in power and compression strokes respectively at the same time as Cylinder 1 is in the exhaust stroke, providing relatively more resistance to the entry of residuals. As a result, the hot exhaust residuals generated from the late combustion event in Cylinder 1 are most likely to be received in Cylinder 2, potentially increasing the propensity for Cylinder 2 to pre-ignite. As such, since neither of cylinder numbers three and four (Cylinder 3, Cylinder 4) are likely to receive exhaust residuals from the late combustion event in Cylinder 1, neither is likely to be affected by the late combustion event.

As discussed above, a misfire or late combustion, as shown for cylinder 1 in map 400 may be detected based on engine operating conditions. The engine controller may then determine the cylinder (e.g., cylinder 2) most likely to receive the exhaust residuals. In other examples, the forcing open of the exhaust valve of cylinder 2 may be determined based on detecting the characteristic mechanical noise after the exhaust valve slams shuts upon returning to the exhaust valve seat, as discussed above. In still further embodiments, air mass flow rates can be additionally used to determine when the engine was at high enough loads to produce pressures high enough to unseat the exhaust valves of neighboring cylinder from the corresponding late burns.

In response to late combustion and/or misfire in Cylinder 1 and to reduce the likelihood of pre-ignition in Cylinder 2, fuel injection during the intake stroke of Cylinder 2 (plot 408) is deactivated. As such, no fuel may be injected into Cylinder 2. However, spark may not be deactivated (as shown by the star 407) since the richness of the exhaust residuals may not be greater than a threshold. For example, the fuel injection at 411 may result in an exhaust air-fuel ratio at or close to stoichiometry. As such, residual fuel may not enter Cylinder 2 and cause pre-ignition. Fuel injection is then reactivated during the following intake stroke (plot 418) in Cylinder 2.

However, in other examples, the engine controller may also deactivate the spark at 407 in order to reduce the likelihood of pre-ignition in Cylinder 2. For example, as shown in map 500 of FIG. 5, no spark may occur during the power stroke following the intake stroke (plot 408) in Cylinder 2. Specifically, map 500 shows a fuel injection 502 during the intake stroke of Cylinder 1. The fuel injection 502 may be larger than the fuel injection 411 shown at map 400. As a result, the exhaust residuals to late combustion of the fuel injection 502 may be richer than the threshold. In response, both fuel injection and spark may be disabled for Cylinder 2. As shown in map 500, no fuel is injected during the intake stroke (plot 408) of Cylinder 2 and no spark occurs in Cylinder 2 during the following power stroke.

As one example, a method may comprise in response to timing of combustion in a first cylinder being retarded from a threshold timing, selectively deactivating fuel to a second cylinder receiving exhaust residuals from the combustion in the first cylinder. The threshold timing is based on the location of mass fraction burned later that 35 ATC. The method further comprises in response to a degree of richness of exhaust residuals received in the second cylinder from the first cylinder, selectively deactivating spark ignition to the second cylinder. In one example, the second cylinder is identified based on each of an identity of the first cylinder, a firing order of the engine, and an exhaust manifold configuration of the engine.

The method may further comprise in response to the timing, further deactivating fuel to a third cylinder receiving exhaust residuals from the second cylinder, and in response to the amount of unburned fuel remaining in the first cylinder, further deactivating spark ignition to the third cylinder.

The selectively deactivating fuel and spark ignition is performed before receiving an indication of pre-ignition in the second cylinder. Further, selectively deactivating spark ignition in response to the amount of unburned fuel includes selectively deactivating spark ignition and fuel in response to the amount of unburned fuel remaining in the first cylinder being higher than a threshold amount. The unburned fuel from the first cylinder increases the risk of combustion in the exhaust manifold, which in turn increases the risk of an exhaust valve being popped open. The hot residuals raise the pre combustion air charge temperature in the second cylinder, increasing the likelihood of pre-ignition.

In this way, by deactivating the delivery of spark and fuel injection in a cylinder receiving exhaust residuals from a cylinder experiencing misfire or late combustion, late burn induced cylinder pre-ignition events occurring due to the forced delivery of hot exhaust residuals into the cylinder can be reduced. By performing a cylinder pre-ignition mitigating action (e.g., selective fuel and/or spark deactivation) in the cylinder receiving exhaust residuals from the late combusting cylinder, a temperature increase of the air charge due to the received exhaust residuals may be decreased and the propensity for late burn induced pre-ignition in the cylinder receiving the hot exhaust residuals may be lowered. In addition, the likelihood of pre-ignition being induced by the cylinder receiving the hot residuals in further cylinders is also reduced. Overall, engine degradation due to pre-ignition can be mitigated.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine control method, comprising:
in response to a first timing of combustion in a first cylinder being retarded from a threshold timing by a first smaller amount, selectively deactivating one of fuel and spark ignition to a second cylinder receiving exhaust residuals from the combustion in the first cylinder; and
in response to a second timing of combustion in the first cylinder being retarded from the threshold timing by a second larger amount, deactivating spark ignition and fuel to the second cylinder.

2. The method of claim 1, wherein the second cylinder is identified based on each of an identity of the first cylinder, a firing order of the engine, and an exhaust manifold configuration of the engine.

3. The method of claim 2, further comprising, in response to the second timing, further deactivating fuel and spark to a third cylinder receiving exhaust residuals from the second cylinder.

4. The method of claim 3, wherein the threshold timing is based on a timing at which a threshold mass fraction of burned fuel remains in the first cylinder.

5. The method of claim 4, wherein the selectively deactivating fuel and spark ignition is performed before receiving an indication of pre-ignition in the second cylinder.

6. The method of claim 1, wherein a larger mass of unburned fuel remains in the first cylinder at the second timing relative to the first timing.

* * * * *